US00RE38206E

(19) United States
(12) Reissued Patent
Bisaiji et al.

(10) Patent Number: US RE38,206 E
(45) Date of Reissued Patent: Jul. 29, 2003

(54) IMAGE TRANSFERRING DEVICE FOR AN IMAGE FORMING APPARATUS

(75) Inventors: Takashi Bisaiji, Yokohama (JP); Hideo Yu, Tokyo (JP); Yasunori Kawaishi, Narashino (JP); Toshiaki Motohashi, Tokyo (JP); Mitsuru Takahashi, Tokyo (JP); Hideki Kamiyama, Yokohama (JP)

(73) Assignee: Ricoh Company, Ltd., Tokyo (JP)

(21) Appl. No.: 09/471,021

(22) Filed: Dec. 23, 1999

Related U.S. Patent Documents

Reissue of:
(64) Patent No.: 5,701,566
Issued: Dec. 23, 1997
Appl. No.: 08/523,208
Filed: Sep. 5, 1995

U.S. Applications:
(63) Continuation of application No. 08/111,943, filed on Aug. 26, 1993, now abandoned.

(30) Foreign Application Priority Data

Aug. 28, 1992 (JP) ..... 4-230254
Jun. 25, 1993 (JP) ..... 5-155857

(51) Int. Cl.[7] ..... G03G 15/01
(52) U.S. Cl. ..... 399/302; 399/313
(58) Field of Search ..... 399/66, 302, 308, 399/310, 313, 314

(56) References Cited

U.S. PATENT DOCUMENTS

| | | | | |
|---|---|---|---|---|
| 3,824,012 A | * | 7/1974 | Iizaba et al. | 399/154 |
| 3,924,943 A | * | 12/1975 | Fletcher | 399/314 |
| 4,407,580 A | * | 10/1983 | Hashimoto et al. | 399/313 |
| 4,736,227 A | * | 4/1988 | Till et al. | 399/296 |
| 4,760,427 A | | 7/1988 | Oyama et al. | |
| 4,912,516 A | * | 3/1990 | Kaieda | 399/312 |
| 5,075,731 A | * | 12/1991 | Kamimura et al. | 399/302 X |
| 5,083,160 A | | 1/1992 | Suzuki et al. | 399/39 |
| 5,160,946 A | * | 11/1992 | Hwang | 399/66 X |
| 5,175,731 A | * | 12/1992 | Suarez | 370/85.6 |
| 5,182,598 A | * | 1/1993 | Hara et al. | 399/303 |
| 5,187,526 A | * | 2/1993 | Zaretsky | 399/302 |
| 5,253,022 A | * | 10/1993 | Takeuchi et al. | 399/313 |
| 5,268,725 A | * | 12/1993 | Koga et al. | 399/312 |
| 5,442,428 A | | 8/1995 | Takahashi et al. | |
| 5,574,558 A | | 11/1996 | Kudo et al. | 356/356 |
| 5,697,031 A | | 12/1997 | Kamiya et al. | 399/301 |
| 5,701,566 A | | 12/1997 | Bisaiji et al. | 399/302 |
| 5,729,024 A | | 3/1998 | Baba et al. | 250/599.36 |
| 5,818,062 A | | 10/1998 | Baba et al. | 250/559.36 |
| 5,870,650 A | | 2/1999 | Takahashi et al. | |
| 5,913,092 A | | 6/1999 | Bisaiji et al. | 399/49 |
| 5,929,436 A | | 7/1999 | Baba et al. | 250/324 |
| 5,983,060 A | | 11/1999 | Namekata et al. | 399/297 |
| 6,006,062 A | | 12/1999 | Takahashi et al. | 399/310 |
| 6,031,633 A | | 2/2000 | Andoh et al. | 358/412 |
| 6,035,157 A | | 3/2000 | Takahashi et al. | 399/98 |
| 6,223,008 B1 | | 4/2001 | Takahashi et al. | 399/66 |
| 6,252,682 B1 | | 6/2001 | Baba et al. | 358/488 |
| 6,269,228 B1 | | 7/2001 | Kayahara et al. | 399/37 |
| 6,445,900 B2 | | 9/2002 | Fukao et al. | 399/302 |

FOREIGN PATENT DOCUMENTS

| | | |
|---|---|---|
| JP | 4-296784 | 10/1992 |
| JP | 5-127546 | 5/1993 |
| JP | 5-333723 | 12/1993 |

* cited by examiner

*Primary Examiner*—William J. Royer
(74) *Attorney, Agent, or Firm*—Oblon, Spivak, McClelland, Maier & Neustadt, P.C.

(57) ABSTRACT

A device incorporated in an image forming apparatus for transferring a toner image from a photoconductive element to an intermediate transfer belt and then from the intermediate transfer belt to a sheet or similar recording medium. An electrode member is implemented as a belt drive roller and located at the rear of a portion of the intermediate transfer belt which lies in a position for transferring the toner image from the belt to a sheet. The electrode member has a specific volume resistance of $10^7$ Ωcm to $10^{12}$ Ωcm.

39 Claims, 5 Drawing Sheets

INVENTION

Fig. 4B INVENTION

IMAGE TRANSFERRING DEVICE FOR AN IMAGE FORMING APPARATUS

Matter enclosed in heavy brackets [ ] appears in the original patent but forms no part of this reissue specification; matter printed in italics indicates the additions made by reissue.

This application is a continuation of application Ser. No. 08/111,943, filed on Aug. 26, 1993, now abandoned.

BACKGROUND OF THE INVENTION

The present invention relates to a copier, printer, facsimile apparatus or similar electrophotographic image forming apparatus and, more particularly, to a device for transferring a toner image transferred from an image carrier to an intermediate transfer body further to a paper sheet or similar recording medium.

It is a common practice with a color image forming apparatus, which belongs to a family of image forming apparatuses of the kind described, to form toner images of three primary colors derived from a subtractive mixture on a sheet or similar recording medium one above the other. Specifically, the toner images are sequentially formed on a photoconductive element, once transferred to an intermediate transfer body (primary transfer) one above the other, and then collectively transferred to a sheet (secondary transfer).

An image transferring device of the type effecting the secondary transfer is disclosed in, e.g., Japanese Patent Laid-Open Publication No. 50170/1990. In this type of device, an intermediate transfer body is implemented as a belt having a specific surface resistance of $10^7$ Ω/cm$^2$ to $10^{12}$ Ω/cm$^2$ and a specific volume resistance of $10^7$ Ωcm to $10^{12}$ Ωcm. An electric field for causing the secondary transfer from the intermediate transfer body to occur is generated by an electrode implemented by a transfer roller. The transfer roller has its surface covered with a dielectric layer. A back electrode is located at the rear of the intermediate transfer body and faces the transfer roller to define a conduction path therebetween. A current flowing on the conduction path generates part of the electric field for the secondary transfer, thereby allowing a relatively low transfer bias to suffice.

However, the problem with the above-described configuration is that the resistance of the conduction path, as measured on the intermediate transfer body, is determined by the positional relation between the back electrode and the transfer roller. Specifically, in order that the current on the conduction path may be stabilized to reduce the required bias voltage for image transfer, the resistance between the back electrode and the transfer roller is required to be extremely low. It follows that the distance between the back electrode and the transfer roller has to be extremely short, i.e., several millimeters to 20 millimeters. This not only restricts the layout of the device but also requires extremely high positioning accuracy.

On the other hand, an implementation for preventing a member that faces the intermediate transfer body from being sequentially charged due to repetitive image formation is disclosed in, e.g., Japanese Patent Laid-Open Publication No. 288879/1989. According to this implementation, a conductive member in the form of a brush or sponge is held in contact with the member which faces the intermediate transfer body, thereby discharging the member. This, in principle, successfully discharges the facing member and, therefore, prevents the transfer characteristic from changing despite aging. In practice, however, it is difficult to carry out this scheme since the charge of the facing member is irregularly distributed and since the contact of the conductive member with the facing member cannot be easily set or maintained uniform. Although a charger may be used for the above purpose, it requires a high-tension power source which adds to the cost. Moreover, a charger produces ozone and nitrogen oxides which would deteriorate not only the facing member but also the intermediate transfer body itself.

SUMMARY OF THE INVENTION

It is, therefore, an object of the present invention to provide an image transferring device for an image forming apparatus which insures a stable electric field for image transfer without regard to the position of a back electrode.

It is another object of the present invention to provide an image transferring device for an image forming apparatus which insures a stable transfer characteristic by eliminating problems ascribable to the charging of a member that faces an intermediate transfer body.

An image transferring device incorporated in an image forming apparatus for transferring a toner image from a toner image carrier to a sheet of the present invention comprises an electric field forming member for forming an electric field for image transfer, and an electrode member connected to ground and located at the back of a portion of the toner image carrier which faces the electric field forming member. The electrode and located at the back of a portion of the toner fed from the electric field forming member to flow to ground and prevents a charge from being injected into the toner image.

BRIEF DESCRIPTION OF THE DRAWINGS

The above and other objects, features and advantages of the present invention will become more apparent from the following detailed description taken with the accompanying drawings in which:

FIGS. 4A and 4B are circuit diagrams associated with FIGS. 3A and 3B, respectively.

DESCRIPTION OF THE PREFERRED EMBODIMENTS

Figure 1:
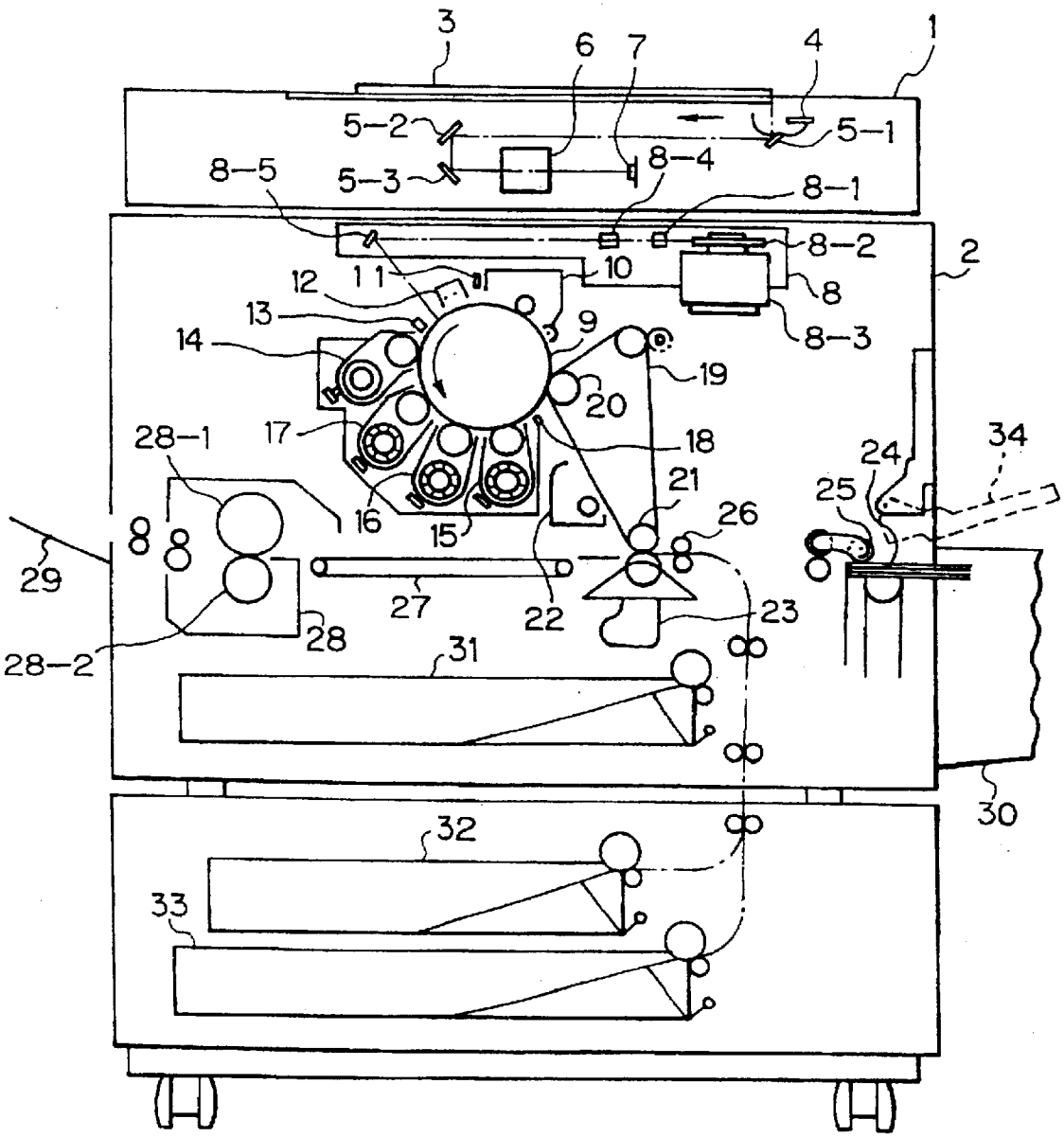
FIG. 1 is a section showing the general construction of an image forming apparatus implemented as a color copier and to which an image transferring device embodying the present invention is applied.

Referring to FIG. 1 of the drawings, an image forming apparatus implemented with an image transferring device embodying the present invention is shown. The image forming apparatus is of the type using an intermediate transfer body in the form of a belt and is implemented as a color copier by way of example. As shown, the color copier is generally made up of a color image reading unit, or color scanner as referred to hereinafter, 1 and a color printer 2. In the color scanner 1, as a lamp 4 illuminates a document 3, the resulting reflection from the document 3 is focused onto a color image sensor 7 via mirrors 5-1, 5-2 and 5-3 and a lens 6. As a result, the color image sensor 7 reads the document image as separated color data, e.g., blue, green and red components and converts them to corresponding electric image signals. Let the color components be referred to as B (Blue), G (Green) and R (Red) components hereinafter. An image processing section, not shown, (Red) components the B, G and R signals on the basis of their intensity levels to output black (BK), cyan (C), magenta (M) and yellow (Y) color image data. The color printer 2 prints out the BK, C, M and Y color image data by using BK, C, M and Y toners, respectively. Such toner images are superposed to complete a four-color image, i.e., full color image.

The color printer 2 has an optical writing unit which transforms the color image signal from the color scanner 1 to an optical signal so as to optically write an image representative of the document image. Specifically, a laser beam issuing from a laser 8-1 is steered by a polygon mirror 8-2 which is rotated by a drive motor 8-3. The laser beam from the polygon mirror 8-2 is incident on a photoconductive drum 9 via a mirror 8-5, electrostatically forming a latent image on the drum 9. The drum 9 is rotated counterclockwise, as indicated by an arrow in the figure. Arranged around the drum 9 are a cleaning unit, including a precleaning discharger, 10, a discharge lamp 11, a charger 12, a potential sensor 13, a BK developing unit 14, a C developing unit 15, an M developing unit 16, a Y developing unit 17, a density pattern sensor 18, an intermediate transfer belt 19, and other conventional units for effecting an electrophotographic copying process.

Figure 2:
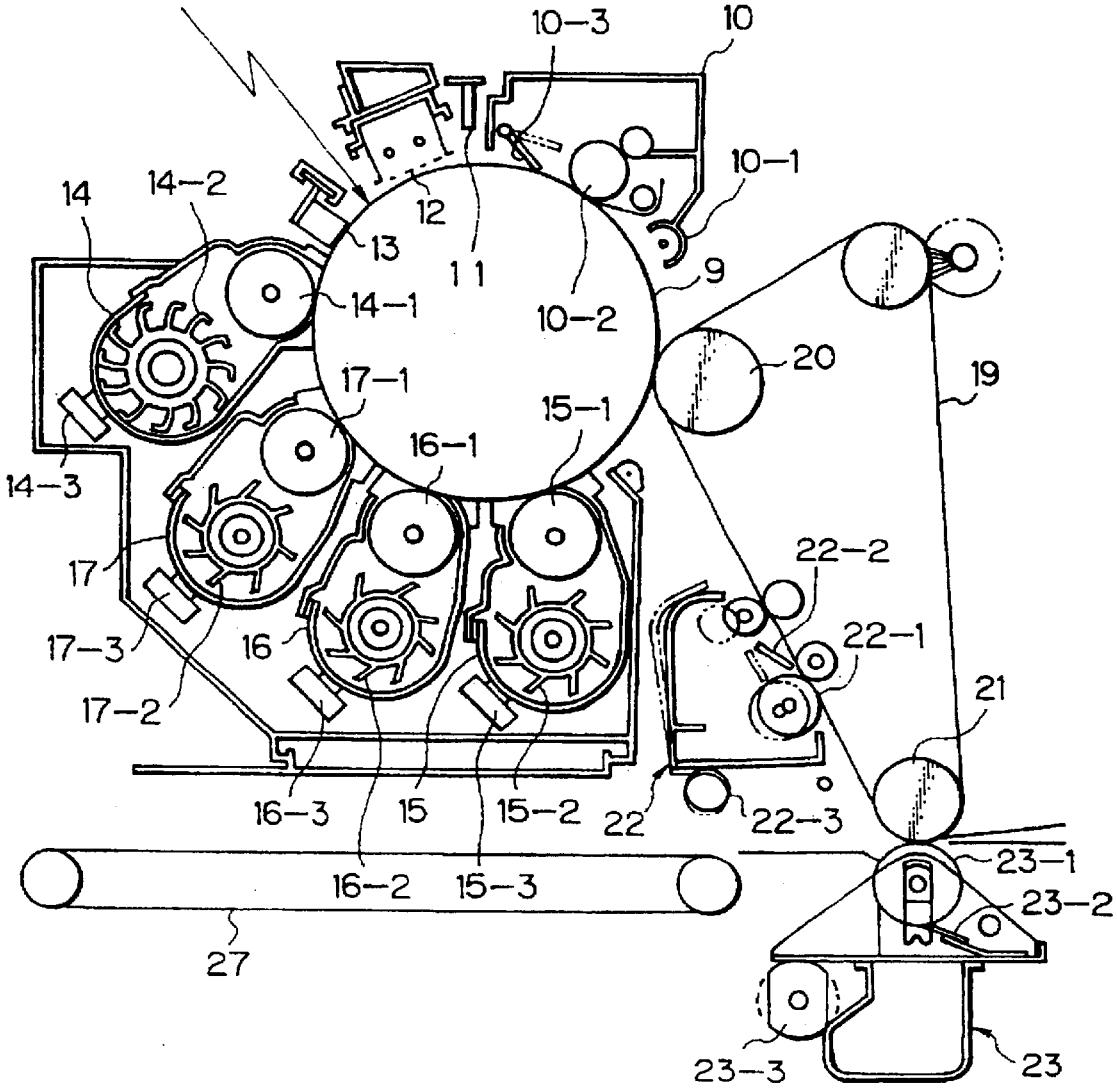
FIG. 2 is an enlarged section showing a photoconductive element and an intermediate transfer belt included in the copier of FIG. 1, as well as various units surrounding them.

As shown in FIG. 2 specifically, the developing units 14, 15, 16 and 17 respectively have developing sleeves 14-1, 15-1, 16-1 and 17-1, paddles 145-2, 15-2, 16-2 and 17-2, and toner sensors 14-3, 15-3, 16-3, and 17-3. The developing sleeves 14-1 to 17-1 are each rotatable to bring a respective developer to a position where it faces the drum 9, thereby developing the associated latent image. The paddles 14-2 to 17-2 are each rotatable to scoop up and agitate respective developer. The toner sensors 14-3 to 17-3 are responsive to the toner concentrations of the associated developers.

The operation of the color copier will be outlined hereinafter, on the assumption that BK, C, M and Y images are sequentially formed in this order, although such an order is only illustrative.

The color scanner 1 starts reading BK image data out of the document 3 at a predetermining timing. The laser beam starts electrostatically forming a latent image on the basis of the BK image data. The latent image derived from the BK image data will be called a BK latent image, and this is also true with C, M and Y. To develop the BK latent image from the leading edge thereof, the developing sleeve 14-1 begins to be rotated before the leading edge of the BK latent image arrives at the developing position of the BK developing unit 14. As a result, the developer deposited on the sleeve 14-1 is brought to the developing position to develop the BK image with a BK toner contained therein. As soon as the trailing edge of the BK latent image moves away from the developing position, the developer on the sleeve 14-1 is brought to an inoperative position. This is completed at least before the leading edge of the next latent image, i.e., C latent image arrives at the developing position.

A BK toner image formed on the drum 9 by the above procedure is transferred to the intermediate transfer belt 19 which is driven at the same speed as the drum 9. Let the image transfer from the drum 9 to the belt 19 be referred to as belt transfer hereinafter. While the drum 9 and belt 19 are i n contact, the belt transfer is effected by a predetermined bias voltage applied to a transfer bias roller 20. BK, C, M and Y toner images sequentially formed on the drum 9 are transferred to the same portion of the belt 19 one after another, so that a four-color image is completed on the belt 19. The four-color image is collectively transferred from the belt 19 to a sheet. The construction and operation of an intermediate transfer belt unit, including the belt 19, will be described in detail later.

After the BK image, a C image begins to be formed on the drum 9. Specifically, the color scanner 1 starts reading C image data out of the document 3 at a predetermined timing. The laser beam electrostatically forms a C latent image on the drum 9 in response to the C image data. The C developing unit 15 starts rotating the developing sleeve 15-1 thereof after the trailing edge of the BK latent image has moved away from a developing position thereof and before the leading edge of the C latent image arrives thereat, thereby bringing the associated developer to the developing position. The developer develops the C latent image with a C toner contained therein. As soon as the trailing edge of the C latent image moves away from the developing position, the developer on the sleeve 15-1 is brought to an inoperative position, as in the BK developing unit 14. This is also completed at least before the leading edge of the next latent image, i.e., M latent image arrives at the developing position.

M and Y image forming procedures are identical with the above-stated BK and C image forming procedures and will not be described to avoid redundancy.

The previously mentioned intermediate transfer belt unit is constructed as follows. The belt 19 is passed over a drive roller 21, the belt transfer bias roller 20, and driven rollers. A motor, not shown, controllably drives the belt 19, as will be described later. As shown in FIG. 2, a belt cleaning unit 22 has a brush roller 22-1, a rubber blade 22-2, and a mechanism 22-3 for moving the unit 22 toward and away from the belt 19. During the belt transfer of the second, third and fourth colors following the first color, i.e., BK, the mechanism 22-3 maintains the belt cleaning unit 22 spaced apart from the belt 19. A sheet transfer unit 23 transfers the four-color image from the belt 19 to a sheet and has a sheet transfer bias roller 21, a roller cleaning blade 23-2, and a mechanism 23-3 for moving the unit 23 toward and away from the belt 19. Usually, the bias roller 23-1 is spaced apart from the belt 19. To transfer the four-color image from the belt 19 to a sheet, the mechanism 23-2 urges the bias roller 23-1 against the belt 19 at a predetermined timing. As a result, the toner image transferred from the belt 19 to a sheet with a predetermined bias applied to the roller 23-1.

As shown in FIG. 1, a sheet 24 is fed by a pick-up roller 25 and a registration roller 26 at such a timing that the leading edge of the four-color image carried on the belt 19 arrives at a sheet transfer position.

After the first or BK toner image has been transferred from the drum 9 to the belt 19 to the trailing edge thereof, the belt 19 may be moved by any one of the following three different systems. The three systems to be described may be efficiently combined in matching relation to the copy size in respect of, e.g., copying speed.

(1) Constant Speed Forward System

This system continuously drives the belt 19 at a constant speed even after the transfer of the toner image of first color, i.e., BK toner image. In this case, image processing is executed such that the leading image of a toner image of the next color formed on the drum 9 meets that of the toner image of first color carried on the belt 19. A sequence for implementing this system is as follows:

(i) continuously driving the belt 19 at a constant speed even after the belt transfer of the BK toner image;

(ii) forming the C toner image on the drum 9 at such a timing that the leading edge thereof meets that of the BK toner image on the belt 19 at a belt transfer position where the belt 19 and drum 9 contact, whereby the C image is transferred to the belt 19 in accurate register with the BK image;

(iii) effecting the M and Y image forming steps in the same manner to form a four-color toner image on the belt 19; and (iv) after the belt transfer of the fourth-color or Y toner image, continuously moving the belt 19 in the forward direction to collectively transfer the four-color toner image to the sheet 24.

(2) Skip Forward System

In this system, after the transfer of the toner image of first color from the drum 9 to the belt 19, the belt 19 is brought out of contact with the drum 9 and then moved in the same direction, but at a higher speed than during the belt transfer of the toner image of first color. On moving a predetermined distance, the belt 19 is again driven at the original speed and brought into contact with the drum 9. This system may be used when the length of the image to be transferred to the belt 19 is mall relative to the length of the belt 19, thereby preventing the cycle time for forming an image on the drum 9 from increasing. A sequence for implementing this system is as follows:

(i) after the belt transfer of the BK toner image, moving the belt 19 away from the drum 9, causing it to skip forward at a high speed, and then driving the belt 19 at the original speed when the belt 19 has moved a predetermined distance, while moving the belt 19 into contact with the drum 9;

(ii) forming the C toner image on the drum 9 such that the leading edge thereof meets that of the BK image on the belt 19 at the belt transfer position, whereby the C image is transferred to the belt 19 in accurate register with the BK image;

(ii) effecting the M and Y image forming steps in the same manner to form a four-color toner image on the belt 19; and (iv) after the belt transfer of the fourth-color or Y toner image, continuously moving the belt 19 forward to collectively transfer the four-color toner image to the sheet 24.

(3) Back-And-Forth or Quick Return System

After the belt transfer of the toner image of first color, this system moves the belt 19 away from the drum 9, drives the belt 19 at a higher speed in the reverse direction, holds the belt 19 stationary at a position where the toner image thereof meets the toner image of the next color carried on the drum 9, and then bring the belt 19 into contact with the drum 9 and moves it in the same direction as the drum 9. Such a procedure is repeated until the toner image of the last color has been transferred to the belt 19. As stated above, this system does not move the belt 19 in the forward direction, but it simply reverses the belt 19 over a distance which the belt 19 has moved. This reduces the distance of movement required of the belt 19 and, therefore, simplifies the control for the registration of the image carried on the belt 19 with the image carried on the drum 9. A sequence for practicing this system is as follows:

(i) after the belt transfer of the BK toner image, moving the belt 19 away from the drum 9, stopping the forward movement of the belt 19, reversing or returning the belt 19 at a high speed, and then stopping the reverse movement of the belt 19 after the leading edge of the BK image on the belt 19 has moved a predetermined distance past the belt transfer position;

(ii) starting movement of the belt 19 again in the forward direction when the leading edge of the C toner image on the drum 9 reaches a predetermined position preceding the belt transfer position, and moving the belt 19 into contact with the drum 9, whereby the C toner image is transferred to the belt 19 in accurate register with the BK image;

(iii) effecting the M and Y image forming steps in the same manner to form a four-color toner image on the belt 19; and (iv) after the belt transfer of the fourth-color or Y toner image, moving the belt 19 the same speed without returning it so as to collectively transfer the four-color toner image to the sheet 24.

Referring again to FIG. 1, the sheet 24 carrying the four-color toner image transferred from the belt 19 by any one of the above systems is transported by a fixing unit 28 by a transport unit 27. In the fixing unit 28, a heat roller 28-1 controlled to a predetermined temperature and a press roller 28-2 cooperate to fix the toner image on the sheet 24. Finally, the sheet 24 is driven out to a copy tray 29 as a full color copy. After the belt transfer, the cleaning unit 10 made up of the precleaning discharger 10-1, brush roller 10-2 and rubber blade 10-3 cleans the surface of the drum 9. Further, the discharge lamp 11 dissipates the charge remaining on the drum 9. After the transfer of the toner image from the belt 19 to the sheet 24, the mechanism 22-3 again urges the cleaning unit 22 against the belt 19 to clean the surface thereof.

In a repeat copy mode, the operation of the color scanner 1 and the image formation on the drum 9 are again executed with the second BK (first color) image at a predetermined timing after the first Y (fourth color) image. After the first four-color toner image has been transferred from the belt 19 to a sheet, the second BK toner image is transferred to the portion of the belt 19 cleaned by the cleaning unit 22.

As shown in FIG. 1, cassettes 30, 31, 32 and 33 are each loaded with a stack of sheets of particular size. As a desired sheet size is entered on an operation panel, not shown, a sheet is fed toward the registration roller 26 from one of the cassettes 30–33 matching the desired sheet size. The reference numeral 34 designates a manual tray available for inserting an OHP (OverHead Projector) sheet or a relatively thick sheet by hand.

While the foregoing description has concentrated on a four-color or full color copy mode, the above procedure will also be repeated in a three-color or two-color copy mode a number of times corresponding to the designated number of colors and a desired number of copies. Further, in a single color or monocolor copy mode, one of the developing units matching the desired color is held operative until a desired number of copies have been produced. The belt 19 is moved forward at a constant speed in contact with the drum 9, while the belt cleaner 22 is held in contact with the belt 19.

Figure 3A:
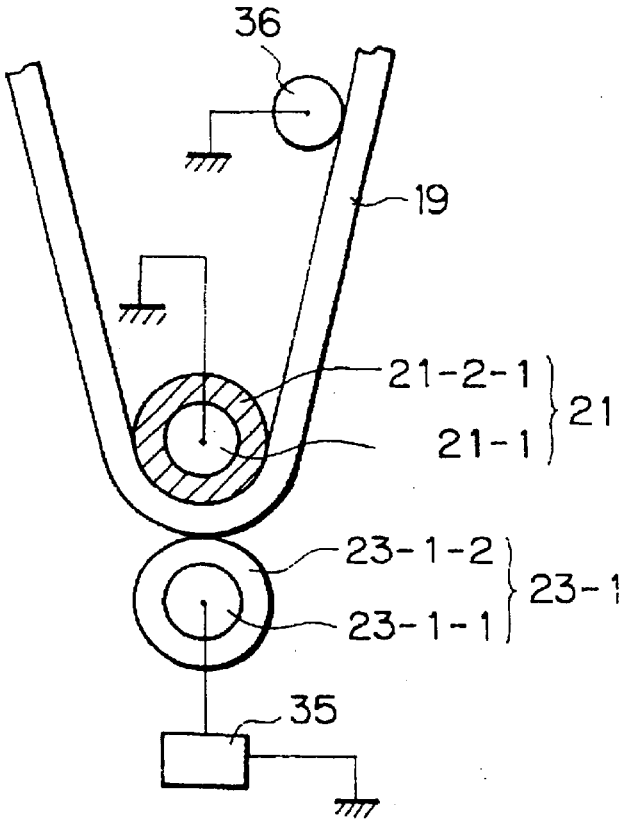
Fig. 3A PRIOR ART
FIG. 3A is a fragmentary view showing a conventional image transferring device.
Figure 3B:
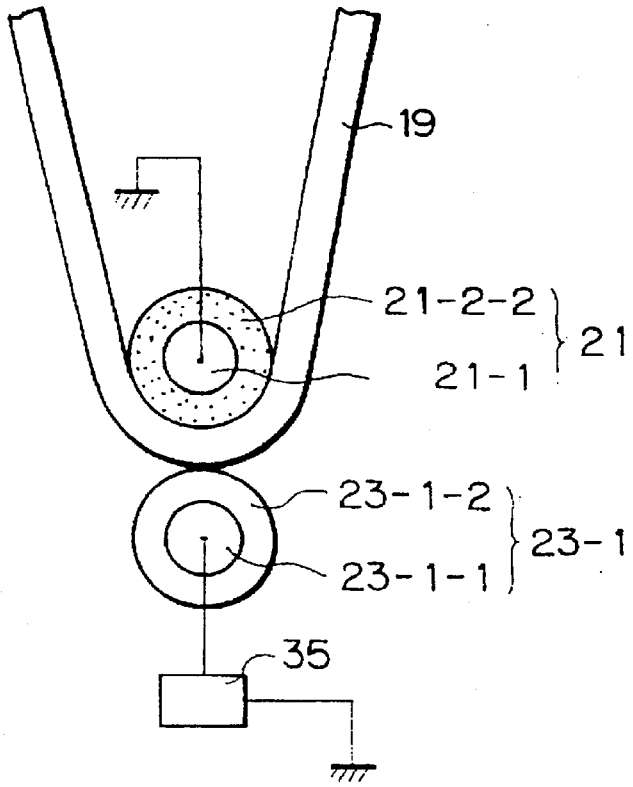
FIG. 3B is a fragmentary view showing the image transferring device embodying the present invention.

FIGS. 3A and 3B respectively show a conventional sheet transfer unit and a sheet transfer unit representative of the embodiment of the present invention. As shown in FIG. 3B, the sheet transfer roller 23-1 included in the embodiment has a metallic core 23-1-1 connected to a bias power source 35, and an elastic member 23-1-2 covering the core 23-1-1. The elastic member 23-1-2 is implemented by an EPDM rubber member in which a conductive agent is dispersed to set up a specific volume resistance of $10^7$ Ωcm to $10^{10}$ Ωcm.

Alternatively, the elastic member 23-1-2 may be constituted by a 5.7 milliliters thick epichlorohydrin rubber having a specific volume resistance of $10^8$ Ωcm to $10^9$ Ωcm, and a 50 microns thick PFA tube covering the epichlorohydrin rubber and having a specific volume resistance of $10^8$ Ωcm to $10^9$ Ωcm. The belt 19 is 0.15±0.015 millimeter thick and has a specific volume resistance of $10^7$ Ωcm to $10^{12}$ Ωcm. To form such a belt 19, a conductive agent is dispersed in polycarbonate, polyester, or fluoric resin or similar resin. The belt drive roller 21 faces the sheet transfer roller 23-1 via the belt 19. The belt drive roller 21 has a core 21-1 made of, e.g., metal and provided with a specific volume resistance of $10^7$ Ωcm to $10^{12}$ Ωcm. The core 21-1 is covered with a 0.3 millimeter thick epichlorohydrin rubber 21-2-2 which has polarity and has no conductive agents dispersed therein.

As shown in FIG. 3A, in the conventional sheet transfer unit, the belt drive roller 21 is made up of the metallic core 21-1 and a member 21-2-1 made of dielectric rubber or similar dielectric material. A ground roller 36 is made of, e.g., metal and connected to ground. The ground roller 36 is held in contact with the belt 19 at a position remote from the belt drive roller 21. In this configuration, the current which flows to the belt 19 between the transfer portion of the transfer roller 23-1 and the ground roller, or back electrode, 36 is affected by the distance between the transfer portion to the ground roller 36. By contrast, the illustrative embodiment does not include a ground roller and, therefore, allows the current to flow to the belt drive roller 21.

Figure 4A:
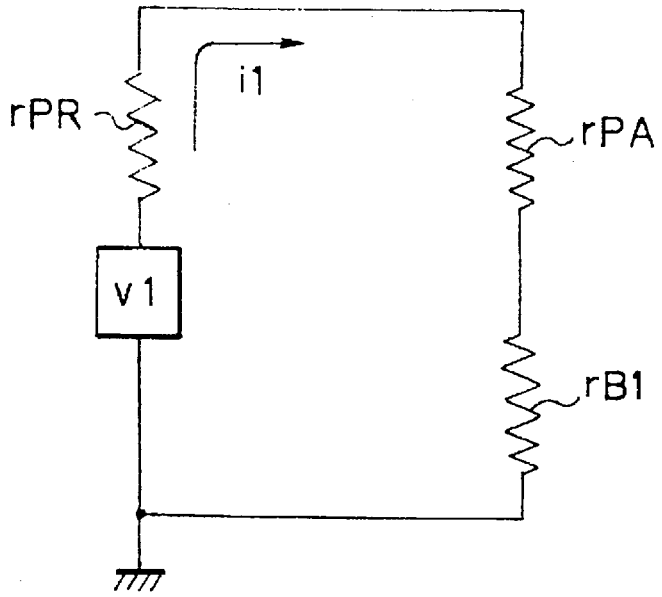
Fig. 4A PRIOR ART
Figure 4A:
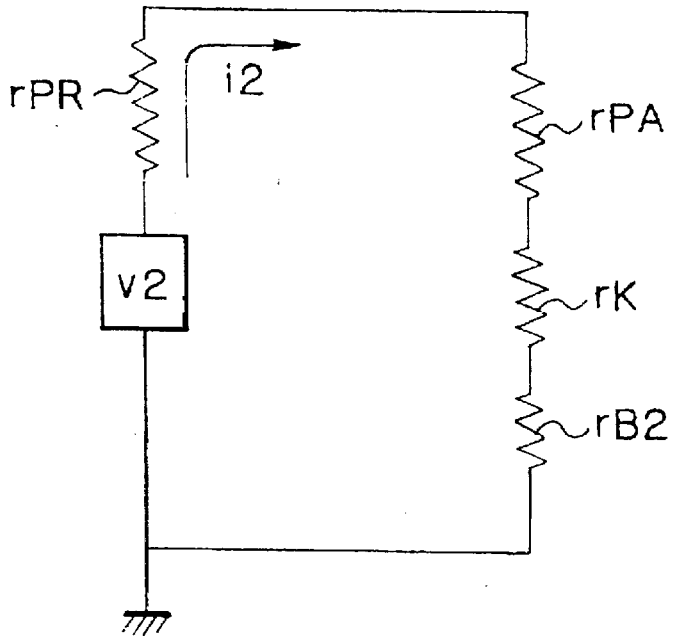
Fig. 4A PRIOR ART

More specifically, FIGS. 4A and 4B respectively show electric circuits representative of the conventional sheet transfer potion and the sheet transfer potion of the illustrative embodiment. In the circuit of FIG. 4A, assume that the sheet transfer roller 23-1 has a resistance rPR at the transfer portion, that a sheet has a resistance rPA, the belt 19 has a resistance rB1, as measured in the direction of movement, ascribable to the distance to the ground roller 36, and the bias voltage is v1. Then, a current i1 flowing through the belt 19 for contributing to the formation of an electric field for image transfer is expressed as:

$$i1=(rPR+rPA+rB1)/v1 \qquad \text{Eq. (1)}$$

Eq. (1) clearly indicates that the current i1 depends on the belt resistance rB1 determined by the distance between the sheet transfer roller 23-1 and the ground roller, or back electrode, 36. Therefore, to reduce the bias voltage v1, the belt resistance rB1 should be low.

Since the belt resistance rB1 is determined by the distance between roller 23-1 and the ground roller 36, as stated above, the ground roller 36 should to be brought as close to the transfer portion as possible. This, however, brings about certain problems, as follows. First, the belt resistance rB1 depending on the position of the ground roller 36 is susceptible to the degree of positional accuracy of the roller 36. For example, assuming that the distance between the rollers 23-1 and 36 is 5 millimeters, a change of ±1 millimeter in the distance would cause the resistance to change by ±20 percent. On the other hand, since the belt resistance rB1 is formed by the surface resistance and specific volume resistance of the belt 19 between the rollers 23-1 and 36, the surface resistance and specific volume resistance of the belt 19 also must remain stable. In practice, however, the conductive agent is not always uniformly dispersed in the entire belt 19, so that the resistances of interest change even if the distance between the rollers 23-1 and 36 is accurate. Thus, stable image transfer is not achievable with the conventional arrangement which relies on the position of the ground roller or back electrode 36.

As shown in FIG. 4B, in the illustrative embodiment, the belt drive roller 21 has a resistance rK while a belt resistance rB2 exists in the volume direction in the transfer portion. The resistances rK and rB2 replace the above-stated belt resistance rB1. Hence, a current i2 derived from a bias voltage v2 is produced by:

$$i2=(rPR+rPA+rK+rB2)/v2 \qquad \text{Eq.(2)}$$

It will be seen from the above that the illustrative embodiment is superior to the conventional arrangement, as follows. The resistance rK of the belt drive roller 21 is determined solely by the material of the roller 21-2-2. Further, since the belt resistance rB2 is determined only by the resistance in the volume direction in the transfer portion, it is free from the influence of the surface resistance and, therefore, stable.

As stated above, the embodiment maintains the current on the belt 19 forming part of the electric field for image transfer stable. Moreover, since the ground roller 36 does not have to be located in the vicinity of the transfer portion, the electric field can be formed without being affected by the positional accuracy of the ground roller 36. These in combination insure stable image transfer from the belt 19 to a sheet.

A series of experiments were conducted to determine a relation between the resistance and the chargeability of the belt drive roller 21. Specifically, whether or not the drive roller 21 is charged by a given bias voltage was determined. The results of these experiments are shown in Table 1 below.

TABLE 1

| SPECIFIC VOLUME RESISTANCE (Ωcm) | BIAS VOLTAGE (kv) | CHARGEABILITY |
|---|---|---|
| $10^6$ | leak | — |
| $10^7$ | 1.5 | ○ |
| $10^8$ | 1.9 | ○ |
| $10^9$ | 2.5 | ○ |
| $10^{10}$ | 2.9 | ○ |
| $10^{11}$ | 3.2 | ○ |
| $10^{12}$ | 3.5 | ○ |
| $10^{13}$ | 4.0 | Δ~x |

In Table 1, a case wherein the roller 21 was not charged and a case wherein it was charged are respectively indicated by a circle and by a triangle or a cross. Whether or not the roller 21 is charged depends on the resistance rK thereof; charging not only prevents a sufficient current from flowing to the roller 21 but also degrades the electric field and, therefore, the transfer characteristic.

As Table 1 indicates, resistances of $10^7$ Ωcm to $10^{12}$ Ωcm prevent the roller 21 from being charged. Also, resistances of $10^7$ Ωcm and below cause so-called leak to occur, i.e., excessively increase the current which contributes to the image transfer. Such a current causes a charge to be injected into the toner on the belt 19 and inverts the polarity of the toner, preventing the toner image from being transferred.

Assume that the resistance forming means of the belt drive roller 21 is implemented by the dispersion of carbon or similar conductive agent, precisely only a layer derived from the division of a conductive agent. Then, although the above-mentioned resistance may be obtained in a macroscopic sense, the distribution of the conductive agent is irregular in a microscopic sense, resulting in lower resistance portions. Such a dispersion of conductive agent is apt to cause discharge breakdown to occur in the covering layer of the roller 21. To eliminate this problem, it is preferable that the resistance forming means does not involve at least a layer containing a dispersion of conductive agent so as not to depend on the state of dispersion.

Figure 5:
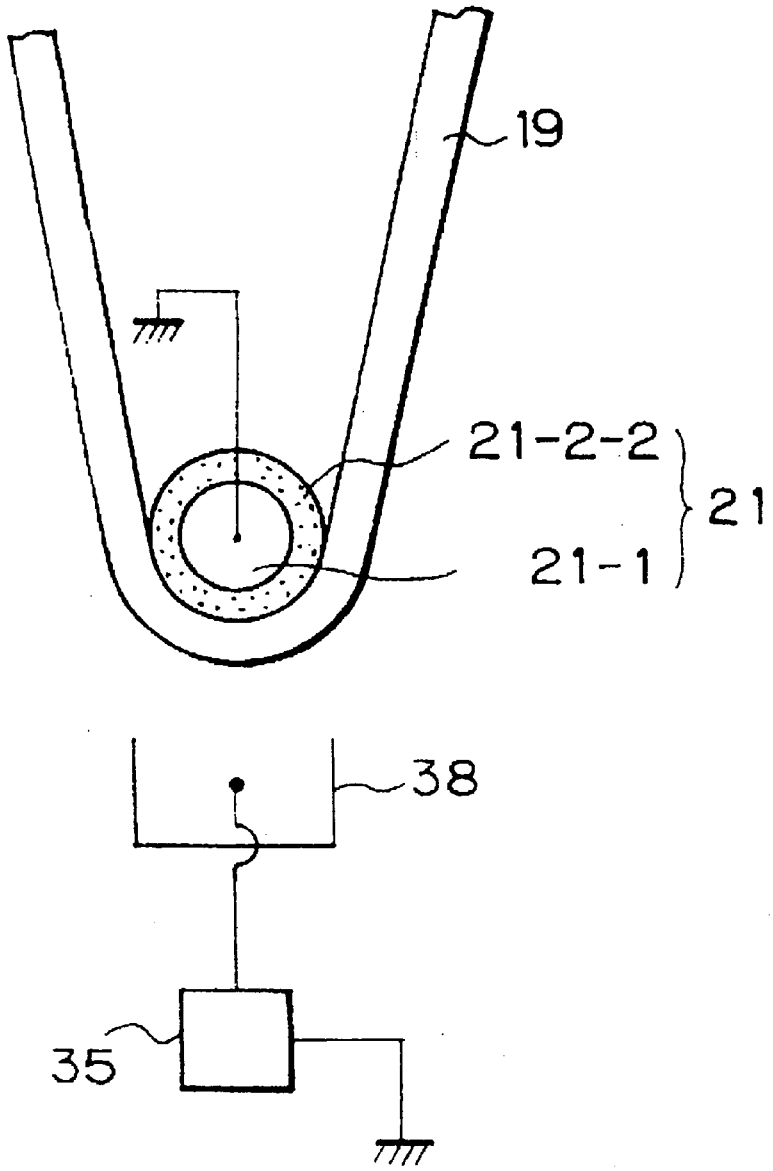
FIG. 5 is a fragmentary view showing a modification of the embodiment.

The embodiment has been shown and described as having a sheet transfer portion implemented by a bias roller. Alternatively, as shown in FIG. 5, the sheet transfer portion may, of course, be implemented by a corona charger 38.

In summary, in accordance with the present invention, an electrode member whose specific volume resistance is $10^7$ Ωcm to $10^{12}$ Ωcm is located to face the back of an intermediate transfer body in a region where a toner image is to be transferred from the transfer body to a sheet. Hence, when a back electrode is provided at the rear of the intermediate transfer body for contributing to the formation of an electric field for image transfer, the electric field can be formed stably without depending on the position of the electrode. This insures stable transfer of a toner image from the intermediate transfer body to a sheet. In addition, by providing the intermediate transfer body with a resistance which prevents the electrode member from being charged, it is possible to maintain the above-mentioned resistance despite aging and, therefore, to stabilize image transfer.

Various modifications will become possible for those skilled in the art after receiving the teachings of the present disclosure without departing from the scope thereof.

What is claimed is:

1. An image transferring device incorporated in an image forming apparatus for transferring a toner image from an intermediate transfer member to a sheet, said device comprising:

electric field forming means for forming an electric field for image transfer; and an electrode member connected to ground and located at a back portion of said intermediate transfer member which faces said electric field forming means, said electrode member having a resistance which causes a current fed from said electric field forming means to flow to ground, wherein said electrode member directly contacts a surface of said intermediate transfer member opposite to a surface which said electric field forming means contacts and at a position where said electrode member faces said electric field forming means.

2. A device as claimed in claim 1, wherein said electric field forming means comprises a metallic core connected to a bias power source, and an elastic member covering said metallic core and having a specific volume resistance of $10^7$ Ωcm to $10^{10}$ Ωcm.

3. A device as claimed in claim 1, wherein said intermediate transfer member comprises an intermediate transfer belt.

4. A device as claimed in claim 3, wherein said intermediate transfer belt has a specific volume resistance of $10^7$ Ωcm to $10^{12}$ Ωcm.

5. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a resistance which causes a current fed from said electric field forming means to flow to ground, wherein said electrode member contacts a surface of said toner image carrier opposite to a surface which said electric field forming means contacts and at a position where said electrode member faces said electric field forming means, wherein said electrode member has a specific volume resistance of $10^7$ Ωcm to $10^{12}$ Ωcm and, wherein said electrode member has a layer consisting only of polar rubber.

6. A device as claimed in claim 5, wherein said polar rubber comprises epichlorohydrin rubber.

7. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a resistance which causes a current fed from said electric field forming means to flow to ground, wherein said electrode member contacts a surface of said toner image carrier opposite to a surface which said electric field forming means contacts and at a position where said electrode member faces said electric field forming means, wherein said electrode member has a specific volume resistance of $10^7$ Ωcm to $10^{12}$ Ωcm and, wherein said electrode member has a layer in which conductive particles are dispersed.

8. An image transferring device incorporated in an image forming apparatus for transferring a toner image from an intermediate transfer member to a sheet, said device comprising:

electric field forming means for forming an electric field for image transfer; and an electrode member connected to ground and located at a back portion of said intermediate transfer member which faces said electric field forming means, said electrode member having a resistance which prevents said electrode member from being charged by said electric field forming means, wherein said electrode member directly contacts a surface of said intermediate transfer member opposite to a surface which said electric field forming means contacts and at a position where said electrode member faces said electric field forming means.

9. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a resistance which prevents said electrode member from being charged by said electric field forming means, wherein said electrode member contacts a surface of said toner image carrier opposite to a surface which said electric field forming means contacts and at a position where said electrode member faces said electric field forming means, wherein said electrode member comprises an epichlorohydrin rubber layer.

10. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a resistance which prevents said electrode member from being charged by said electric field forming means, wherein said electrode member contacts a surface of said toner image carrier opposite to a surface which said electric field forming means contacts and at a position where said electrode member faces said electric field forming means, wherein said electrode member comprises a layer in which a conductive agent is dispersed.

11. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a specific volume resistance of $10^7$ Ωcm to $10^{12}$ Ωcm, wherein said electrode member contacts a surface of said toner image carrier opposite to a surface which said electrode field forming means contacts and at a position where said electrode member faces said electric field forming means.

12. An image transferring device incorporated in an image forming apparatus for transferring a toner image from an intermediate transfer member to a sheet, said device comprising:

electric field forming means for forming an electric field for image transfer; and an electrode member connected to ground and located at a back portion of said intermediate transfer member which faces said electric field forming means, said electrode member having a resistance layer in which at least a conductive agent is not dispersed, wherein said electrode member directly contacts a surface opposite to a surface which said electric field forming means contacts and at a position where said electrode member faces said electric field forming means.

13. An image transferring device incorporated in an image forming apparatus for transferring a toner image from a toner image carrier to a sheet, said device comprising:

electric field forming means for forming an electric field for image transfer; and an electrode member connected to ground and located at a back portion of said toner image carrier which faces said electric field forming means, said electrode member having a resistance layer in which at least a conductive agent is not dispersed, wherein said electrode member contacts a surface of said toner image carrier opposite to a surface which said electric field forming means contacts and at a position where said electrode member faces said electric field forming means, wherein said resistance layer is made of epichlorohydrin rubber.

*14. An image transferring device incorporated in an image forming apparatus for transferring a toner image from an intermediate transfer member to a sheet, said device comprising:*

*electric field forming means for forming an electric field for image transfer; and*

*an electrode member connected to ground and located at a portion of said intermediate transfer member which faces said electric field forming means, said electrode member having a resistance which causes a current fed from said electric field forming means to flow to ground, wherein said electrode member directly contacts a surface of said intermediate transfer member opposite to a surface which said electric field forming means contacts and at a position where said electrode member faces said electric field forming means.*

*15. A device as claimed in claim 14, wherein said electric field forming means comprises a metallic core connected to a bias power source, and an elastic member covering said metallic core and having a specific volume resistance of $10^7$ Ωcm to $10^{10}$ Ωcm.*

*16. A device as claimed in claim 14, wherein said intermediate transfer member comprises an intermediate transfer belt.*

*17. A device as claimed in claim 16, wherein said intermediate transfer belt has a specific volume resistance of $10^7$ Ωcm to $10^{12}$ Ωcm.*

*18. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a resistance which causes a current fed from said electric field forming means to flow to ground, wherein said electrode member contacts a surface of said toner image carrier opposite to a surface which said electric field forming means contacts and at a position where said electrode member faces said electric field forming means, wherein said electrode member has a specific volume resistance of $10^7$ Ωcm to $10^{12}$ Ωcm and, wherein said electrode member has a layer consisting only of polar rubber.*

*19. A device as claimed in claim 18, wherein said polar rubber comprises epichlorohydrin rubber.*

*20. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a resistance which causes a current fed from said electric field forming means to flow to ground, wherein said electrode member contacts a surface of said toner image carrier opposite to a surface which said electric field forming means contacts and at a position where said electrode member faces said electric field forming means, wherein said electrode member has a specific volume resistance of $10^7$ Ωcm to $10^{12}$ Ωcm and, wherein said electrode member has a layer in which conductive particles are dispersed.*

*21. An image transferring device incorporated in an image forming apparatus for transferring a toner image from an intermediate transfer member to a sheet, said device comprising:*

*electric field forming means for forming an electric field for image transfer; and*

*an electrode member connected to ground and located at a portion of said intermediate transfer member which faces said electric field forming means, said electrode member having a resistance which prevents said elec-*

*trode member from being charged by said electric field forming means, wherein said electrode member directly contacts a surface of said intermediate transfer member opposite to a surface which said electric field forming means contacts and at a position where said electrode member faces said electric field forming means.*

*22. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a resistance which prevents said electrode member from being charged by said electric field forming means, wherein said electrode member contacts a surface of said toner image carrier opposite to a surface which said electric field forming means contacts and at a position where said electrode member faces said electric field forming means, wherein said electrode member comprises an epichlorohydrin rubber layer.*

*23. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a resistance which prevents said electrode member from being charged by said electric field forming means, wherein said electrode member contacts a surface of said toner image carrier opposite to a surface which said electric field forming means contacts and at a position where said electrode member faces said electric field forming means, wherein said electrode member comprises a layer in which a conductive agent is dispersed.*

*24. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a specific volume resistance of $10^7$ Ωcm to $10^{12}$ Ωcm, wherein said electrode member contacts a surface of said toner image carrier opposite to a surface which said electrode field forming means contacts and at a position where said electrode member faces said electric field forming means.*

*25. An image transferring device incorporated in an image forming apparatus for transferring a toner image from an intermediate transfer member to a sheet, said device comprising:*

*electric field forming means for forming an electric field for image transfer; and*

*an electrode member connected to ground and located at a portion of said intermediate transfer member which faces said electric field forming means, said electrode member having a resistance layer in which at least a conductive agent is not dispersed, wherein said electrode member directly contacts a surface opposite to a surface which said electric field forming means contacts and at a position where said electrode member faces said electric field forming means.*

*26. An image transferring device incorporated in an image forming apparatus for transferring a toner image from a toner image carrier to a sheet, said device comprising:*

*electric field forming means for forming an electric field for image transfer; and*

*an electrode member connected to ground and located at a portion of said toner image carrier which faces said electric field forming means, said electrode member having a resistance layer in which at least a conductive agent is not dispersed, wherein said electrode member contacts a surface of said toner image carrier opposite to a surface which said electric field forming means contacts and at a position where said electrode member faces said electric field forming means, wherein said resistance layer is made of epichlorohydrin rubber.*

*27. An image transferring device incorporated in an image forming apparatus for transferring a toner image from an intermediate transfer member to a sheet, said device comprising:*

*a transfer roller configured to form an electric field for image transfer; and*

*an electrode member connected to ground and located at a portion of said intermediate transfer member which faces said transfer roller, said electrode member having a resistance which causes a current fed from said transfer roller to flow to ground, wherein said electrode member directly contacts a surface of said intermediate transfer member opposite to a surface which said transfer roller contacts and at a position where said electrode member faces said transfer roller.*

*28. A device as claimed in claim 27, wherein said transfer roller comprises a metallic core connected to a bias power source, and an elastic member covering said metallic core and having a specific volume resistance of $10^7$ Ωcm to $10^{10}$ Ωcm.*

*29. A device as claimed in claim 27, wherein said intermediate transfer member comprises an intermediate transfer belt.*

*30. A device as claimed in claim 29, wherein said intermediate transfer belt has a specific volume resistance of $10^7$ Ωcm to $10^{12}$ Ωcm.*

*31. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a resistance which causes a current fed from said transfer roller to flow to ground, wherein said electrode member contacts a surface of said toner image carrier opposite to a surface which transfer roller contacts and at a position where said electrode member faces said transfer roller, wherein said electrode member has a specific volume resistance of $10^7$ Ωcm to $10^{12}$ Ωcm and, wherein said electrode member has a layer consisting only of polar rubber.*

*32. A device as claimed in claim 31, wherein said polar rubber comprises epichlorohydrin rubber.*

*33. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a resistance which causes a current fed from said transfer roller to flow to ground, wherein said electrode member contacts a surface of said toner image carrier opposite to a surface which said transfer roller contacts and at a position where said electrode member faces said transfer roller, wherein said electrode member has a specific volume resistance of $10^7$ Ωcm to $10^{12}$ Ωcm and, wherein said electrode member has a layer in which conductive particles are dispersed.*

*34. An image transferring device incorporated in an image forming apparatus for transferring a toner image from an intermediate transfer member to a sheet, said device comprising:*

*a transfer roller configured to form an electric field for image transfer; and*

*an electrode member connected to ground and located at a portion of said intermediate transfer member which faces said transfer roller, said electrode member having a resistance which prevents said electrode member from being charged by said transfer roller, wherein said electrode member directly contacts a surface of said intermediate transfer member opposite to a surface which said transfer roller contacts and at a position where said electrode member faces said transfer roller.*

*35. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a resistance which prevents said electrode member from being charged by said transfer roller, wherein said electrode member contacts a surface of said toner image carrier opposite to a surface which said transfer roller contacts and at a position where said electrode member faces said transfer roller, wherein said electrode member comprises an epichlorohydrin rubber layer.*

*36. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a resistance which prevents said electrode member from being charged by said transfer roller, wherein said electrode member contacts a surface of said toner image carrier opposite to a surface which said transfer roller contacts and at a position where said electrode member faces said transfer roller, wherein said electrode member comprises a layer in which a conductive agent is dispersed.*

*37. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a specific volume resistance of $10^7$ Ωcm to $10^{12}$ Ωcm, wherein said electrode member contacts a surface of said toner image carrier opposite to a surface which said transfer roller contacts and at a position where said electrode member faces said transfer roller.*

*38. An image transferring device incorporated in an image forming apparatus for transferring a toner image from an intermediate transfer member to a sheet, said device comprising:*

*a transfer roller configured to form an electric field for image transfer; and*

*an electrode member connected to ground and located at a portion of said intermediate transfer member which faces said transfer roller, said electrode member having a resistance layer in which at least a conductive agent is not dispersed, wherein said electrode member directly contacts a surface opposite to a surface which said transfer roller contacts and at a position where said electrode member faces said transfer roller.*

*39. An image transferring device incorporated in an image forming apparatus for transferring a toner image from a toner image carrier to a sheet, said device comprising:*

*a transfer roller configured to form an electric field for image transfer; and*

*an electrode member connected to ground and located at a portion of said toner image carrier which faces said transfer roller, said electrode member having a resistance layer in which at least a conductive agent is not dispersed, wherein said electrode member contacts a surface of said toner image carrier opposite to a surface which said transfer roller contacts and at a position where said electrode member faces said transfer roller, wherein said resistance layer is made of epichlorohydrin rubber.*

* * * * *